US011316657B2

(12) United States Patent
Cheon et al.

(10) Patent No.: US 11,316,657 B2
(45) Date of Patent: Apr. 26, 2022

(54) USER DEVICE AND ELECTRONIC DEVICE FOR SHARING DATA BASED ON BLOCK CHAIN AND HOMOMORPHIC ENCRYPTION TECHNOLOGY AND METHODS THEREOF

(71) Applicant: Crypto Lab Inc., Seoul (KR)

(72) Inventors: Jung Hee Cheon, Seoul (KR); Dongwoo Kim, Seoul (KR)

(73) Assignee: Crypto Lab Inc., Seoul (KR)

(*) Notice: Subject to any disclaimer, the term of this patent is extended or adjusted under 35 U.S.C. 154(b) by 370 days.

(21) Appl. No.: 16/375,325

(22) Filed: Apr. 4, 2019

(65) Prior Publication Data
US 2019/0312719 A1      Oct. 10, 2019

(30) Foreign Application Priority Data

Apr. 6, 2018   (KR) .................. 10-2018-0040584

(51) Int. Cl.
*H04L 9/00* (2022.01)
*H04L 9/08* (2006.01)

(52) U.S. Cl.
CPC ............ *H04L 9/008* (2013.01); *H04L 9/0861* (2013.01); *H04L 2209/38* (2013.01); *H04L 2209/56* (2013.01)

(58) Field of Classification Search
CPC ..... H04L 9/008; H04L 9/3239; H04L 9/0861; H04L 9/14; H04L 2209/38; H04L 2209/56; H04L 2209/42
USPC .......................................................... 380/28
See application file for complete search history.

(56) References Cited

U.S. PATENT DOCUMENTS

| 7,743,253 B2* | 6/2010 | Lauter .................. H04L 9/3073 |
| | | 713/170 |
| 8,094,810 B2 | 1/2012 | Hohenberger et al. |
| 9,077,540 B2* | 7/2015 | Puiggali ............... H04L 9/3218 |
| 10,198,592 B2 | 2/2019 | Seo et al. |
| 10,277,395 B2* | 4/2019 | Camenisch ............. H04L 9/008 |
| 10,594,472 B2* | 3/2020 | Ding ........................ H04L 9/14 |
| 11,005,665 B2* | 5/2021 | Lu ............................ H04L 9/008 |

(Continued)

FOREIGN PATENT DOCUMENTS

| EP | 2704354 A1 | 3/2014 |
| KR | 10-1260355 B1 | 5/2013 |

(Continued)

OTHER PUBLICATIONS

International Search Report issued in International Application No. PCT/KR2019/001487, dated May 14, 2019 with English translation (6 pages).

(Continued)

*Primary Examiner* — Amare F Tabor
(74) *Attorney, Agent, or Firm* — Osha Bergman Watanabe & Burton LLP

(57) ABSTRACT

A data sharing method of a user device is provided. The data sharing method includes receiving, from a server device storing information, a private key corresponding to the information, performing a homomorphic encryption of the private key by a homomorphic encryption key provided from the server device, and generating a switch key, and uploading the switch key to a blockchain system. Accordingly, a more effective and clear data sharing is provided.

6 Claims, 10 Drawing Sheets

(56) References Cited

U.S. PATENT DOCUMENTS

| | | | | |
|---|---|---|---|---|
| 11,048,805 | B2* | 6/2021 | Bohli | ............... G06F 21/602 |
| 2008/0301448 | A1* | 12/2008 | Charles | ............... H04L 9/3247 |
| | | | | 713/176 |
| 2010/0138471 | A1 | 6/2010 | Tsutsui | |
| 2014/0189364 | A1 | 7/2014 | Kolesnikov | |
| 2016/0119292 | A1 | 4/2016 | Kaseda et al. | |
| 2018/0276626 | A1* | 9/2018 | Laiben | ............... G06Q 20/02 |

FOREIGN PATENT DOCUMENTS

| | | |
|---|---|---|
| KR | 10-1590076 B1 | 2/2016 |
| KR | 10-1600016 B1 | 3/2016 |
| KR | 10-2016-0050605 A | 5/2016 |
| KR | 20170004456 A | 1/2017 |
| KR | 10-2017-0022455 A | 3/2017 |
| KR | 101739203 B1 | 5/2017 |

OTHER PUBLICATIONS

Written Opinion issued in Application No. PCT/KR2019/001487, dated May 14, 2019 with English translation (12 pages).
Michael Egorov et al.,"Nucypher KMS: Decentralized key management system"; arXiv preprint arXiv:1707.06140; Nov. 2017 (21 pages).
Pierrick Méaux et al., "Towards Stream Ciphers for Efficient FHE with Low-noise Ciphertexts"; Eurocrypt 2016; vol. 9665; May 2016 (40 pages).
Martin Albrecht et al., "Ciphers for MPC and FHE"; Eurocrypt 2015; vol. 9056; Apr. 2015 (30 pages).
Extended European Search Report issued in corresponding European Application No. 19781221.7, dated Dec. 8, 2021 (7 pages).
Yue Fu, "Meta-Key: A Secure Data-Sharing Protocol under Blockchain-Based Decentralised Storage Architecture", arxiv.org, Cornell University Library, 201 Olin Libryary Cornell University, Ithaca, NY 14853, Oct. 22, 2017, XP080830646 (5 pages).
Biao Wang et al., "Leveled FHE with Matrix Message Space", ICIAP: International Conference On Image Analysis and Processing, 17th International Conference, Naples, Italy, Sep. 9-13, 2013. Proceedings, pp. 260-262, Feb. 4, 2018, XP047464282 (18 pages).

* cited by examiner

USER DEVICE AND ELECTRONIC DEVICE FOR SHARING DATA BASED ON BLOCK CHAIN AND HOMOMORPHIC ENCRYPTION TECHNOLOGY AND METHODS THEREOF

CROSS-REFERENCE TO RELATED APPLICATION

This application is based on and claims priority under 35 U.S.C. 119 to Korean Patent Application No. 10-2018-0040584, filed on Apr. 6, 2018, in the Korean Intellectual Property Office, the disclosure of which is herein incorporated by reference in its entirety.

BACKGROUND

1. Field

The disclosure relates to devices and methods for sharing data. More particularly, the disclosure relates to devices and methods for sharing encrypted personal information by utilizing homomorphic encryption technology.

2. Description of Related Art

Electronic devices are used in various fields thanks to the development of electronic technology and these electronic devices provide a variety of functions. In particular, in the age of Big Data, the importance of data usage has significantly increased.

Data of each individual included in Big Data may be collected via various routes. For example, in public offices or public institutions such as a hospital, a school and the like, a user seeking a service may have to enter his/her personal information such as name or address, resident registration number, phone number, and the like. The entered personal information may be included in Big Data and utilized very usefully.

However, in a process of utilizing personal information, a risk of privacy invasion may be present. In particular, even if a user gives consent on usage of his/her personal information, there is a problem that monitoring how the information is used by the person who receives consent is impossible, and that the information may be leaked to a third party and unlawful harm may be caused.

Accordingly, there is a demand for data sharing technology with improved security.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an electronic device and methods for sharing data by utilizing blockchain technology and homomorphic encryption technology.

In accordance with an aspect of the disclosure, a data sharing method of a user device is provided. The data sharing method includes receiving, from a server device storing information, a private key corresponding to the information, performing a homomorphic encryption of the private key by a homomorphic encryption key provided from the server device, and generating a switch key, and publishing the switch key in a blockchain system.

In accordance with an aspect of the disclosure, a data sharing method of an electronic device is provided. The data sharing method includes acquiring a switch key from a blockchain system, switching a personal information cryptogram stored in a server device to a personal information homomorphic cryptogram by the switch key, applying an analytic function to the personal information homomorphic cryptogram, and acquiring a result of analysis for which a homomorphic encryption is performed, uploading the result of analysis to the blockchain system, and based on a processing result of the result of analysis in a plurality of monitoring devices respectively including a partial secret key being published in the blockchain system, decrypting the processing result.

The personal information cryptogram may be a cryptogram which is generated by encrypting personal information of a user by a private key generated in the server device. The switch key may be a key homomorphic cryptogram for which a homomorphic encryption is performed to the private key.

The data sharing method of the electronic device may include uploading the analytic function to the blockchain system, and providing a cryptocurrency commonly used in the blockchain system as an incentive for at least one of the server device or the plurality of monitoring devices.

The processing result may be a plurality of partial cryptograms which are generated by encrypting a partial decryptogram for which a decryption of the result of analysis is performed using the partial secret key by each of the plurality of monitoring devices to a public key published by the electronic device.

The decrypting may include identifying a number of the plurality of partial cryptograms acquired from the blockchain system, and based on the number exceeding a preset threshold, decrypting each of the plurality of partial cryptograms and combining the decrypted plurality of partial cryptograms.

In accordance with an aspect of the disclosure, an electronic device is provided. The electronic device includes a communicator configured to communicate with a blockchain system and a server device, a memory configured to store a switch key acquired from the blockchain system via the communicator, and a processor configured to acquire a personal information cryptogram stored in the server device via the communicator, and switch the acquired personal information cryptogram to a homomorphic cryptogram by the switch key.

The processor may be configured to apply an analytic function to the homomorphic cryptogram, and acquire a result of analysis for which a homomorphic encryption is performed, to upload the result of analysis to the blockchain system via the communicator, and based on a processing result of the result of analysis in a plurality of monitoring devices respectively including a partial secret key being published in the blockchain system, to decrypt the processing result.

The personal information cryptogram may be a cryptogram which is generated by encrypting personal information of a user by a private key generated in the server device. The switch key may be a key homomorphic cryptogram for which a homomorphic encryption is performed to the private key.

The processor may be configured to upload the analytic function to the blockchain system, and to provide a cryptocurrency commonly used in the blockchain system as an incentive for at least one of the server device or the plurality of monitoring devices.

The processing result may be a plurality of partial cryptograms which are generated by encrypting a partial decryptogram for which a decryption of the result of analysis is performed using the partial secret key by each of the plurality of monitoring devices to a public key published by the electronic device.

The processor may be configured to, based on a number of the plurality of partial cryptograms acquired from the blockchain system exceeding a preset threshold, decrypt the plurality of partial cryptograms and combine the decrypted plurality of partial cryptograms.

In accordance with another aspect of the disclosure, a data sharing method of a user device is provided. The data sharing method includes providing information to a server device, and acquiring a private key corresponding to the information, and uploading the private key to a blockchain system.

In accordance with another aspect of the disclosure, a data sharing method of a monitoring device is provided. The data sharing method includes acquiring, from a blockchain system, an analytic function and a result of analysis of a homomorphic cryptogram obtained by the analytic function, verifying a complexity of the analytic function, based on a verification of the analytic function being performed, generating a partial decryptogram of a result of analysis of the homomorphic cryptogram by a partial secret key provided to the monitoring device, generating a partial cryptogram by encrypting the generated partial decryptogram by a public key published by an electronic device and uploading the partial cryptogram to the blockchain system.

Alternatively, a business model for sharing data may be provided. The business model includes publishing, in a blockchain system, a switch key generated by performing a homomorphic encryption of a private key provided by a manager managing personal information, publishing, in the blockchain system, a result of analysis generated by switching a personal information cryptogram kept by the manager to a personal information homomorphic cryptogram using the switch key, and analyzing the personal information homomorphic encryption in a predetermined method, performing a partial decryption of the result of analysis respectively by a plurality of monitors respectively possessing a partial secret key, and providing a reward to at least one of the manager or the plurality of monitors.

According to the various embodiments of the disclosure described above, a data management platform in which all of a data management institution, an individual, and a data utilizer participate can be provided. More specifically, it is possible to efficiently share data while providing reliability for personal information utilization.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, and advantages of certain embodiments of the disclosure will be more apparent from the following description taken in conjunction with the accompanying drawings, in which.

The same reference numerals are used to represent the same elements throughout the drawings.

DETAILED DESCRIPTION

Figure 1:
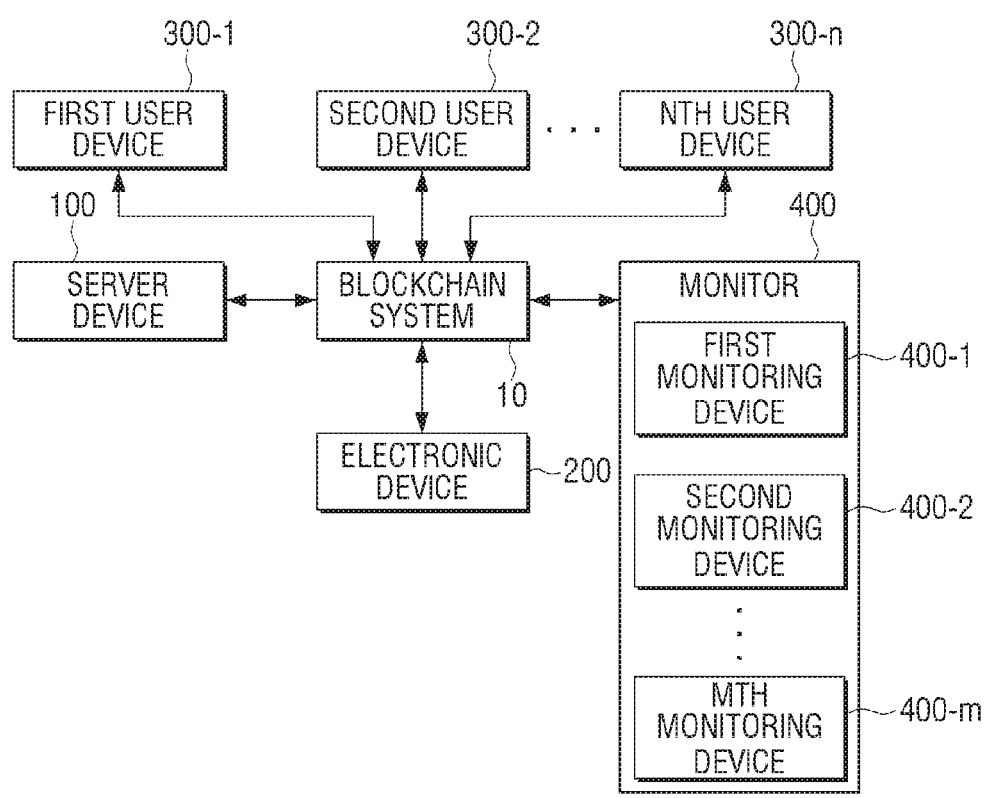
FIG. 1 is a diagram illustrating a configuration of a data sharing system, according to an embodiment of the disclosure.

Various embodiments will now be described more fully with reference to the accompanying drawings in which some embodiments are shown. However, it should be understood that the disclosure is not limited to the specific embodiments described hereinafter, but includes various modifications, equivalents, and/or alternatives of the embodiments of the disclosure. In relation to explanation of the drawings, similar drawing reference numerals may be used for similar constituent elements.

It will be understood that, although the terms first, second, etc. may be used herein in reference to elements of the disclosure regardless of an order and/or importance, such elements should not be construed as limited by these terms. The terms are used only to distinguish one element from other elements. For example, a first user appliance and a second user appliance may indicate different user appliances regardless of their order or importance. For example, without departing from the scope as described herein, a first element may be referred to as a second element, or similarly, a second element may be referred to as a first element.

If it is described that a certain element (e.g., first element) is "operatively or communicatively coupled with/to" or is "connected to" another element (e.g., second element), it should be understood that the certain element may be connected to the other element directly or through still another element (e.g., third element). Meanwhile, when it is mentioned that one element (e.g., first element) is "directly coupled" with or "directly connected to" another element (e.g., second element), it may be understood that there is no element (e.g., third element) present between the element and the other element.

The terms used in the description are used to merely describe a specific embodiment, but may not intend to limit the scope of other embodiments. Unless otherwise defined specifically, a singular expression may encompass a plural expression. All terms (including technical and scientific terms) used in the description could be used as meanings commonly understood by those ordinary skilled in the art to which the disclosure belongs. The terms that are used in the disclosure and are defined in a general dictionary may be used as meanings that are identical or similar to the meanings of the terms from the context of the related art, and they are not interpreted ideally or excessively unless they have been clearly and specially defined. According to circumstances, even the terms defined in the embodiments of the disclosure should not be interpreted as excluding the embodiments of the disclosure.

Hereinafter, various embodiments of the disclosure will be described in detail with reference to the accompanying drawings.

FIG. 1 is a block diagram illustrating a configuration of a data sharing system, according to an embodiment of the disclosure. Referring to FIG. 1, a data sharing system may include a server device 100, an electronic device 200, a plurality of user devices 300-1 to 300-n, a monitor 400, and a blockchain system 10.

The blockchain system 10 is a system in which a plurality of devices distributively retain data, blocks are generated per predetermined unit time, and the respective devices perform verification. The blockchain system 10 may be also referred to as a blockchain network. The blockchain system 10 may include a blockchain application and a platform. The respective devices of FIG. 1 may install a blockchain application to use the blockchain system 10.

The server device 100 is a device for storing and managing personal information. The server device 100 may be called a data management institution, a management device or a personal information database (DB), but will be collectively called herein a server device 100.

The plurality of user devices 300-1 to 300-n refers to an electronic device owned by each user. For example, the plurality of user devices 300-1 to 300-n may be implemented as a mobile phone, a tablet personal computer (PC), a PC, a laptop PC, a kiosk, and the like.

The server device 100 may obtain personal information from each of the plurality of user devices 300-1 to 300-n. However, the example is not limited thereto, and the personal information may be obtained through an input means provided in the server device 100. In FIG. 1, for convenience of explanation, one server device 100 is illustrated. However, multiple server devices 100 may be present. In an actual example, the server device 100 may be implemented as multiple devices for storing each individual's data, such as a hospital, a public institution, a financial institution, and the like. According to various embodiments of the disclosure, it is possible to perform efficient data sharing even when a plurality of different server devices are present.

The server device 100 may assign a private key to a user providing his/her personal information. The private key refers to a symmetric key for encrypting the private information. For example, the server device 100 may generate a private key by setting a master encryption key MSK and then, applying a Pseudo Random Function (PRF) to the master encryption key. When the private key is expressed as $S_{i,j}$, the $S_{i,j}$ may be expressed as $PRF(MSK_j, i)$.

The server device 100 may assign the generated private key to the corresponding user, encrypt personal information $(D_{i,j})$ provided by the user with the corresponding private key $(S_{i,j})$ and generate personal information cryptogram $(enc_{si,j}(D_{i,j}))$, and then store the generated personal information cryptogram $(enc_{si,j}(D_{i,j}))$. Assigning the private key may refer to transmitting the private key to a user device owned by the user. The user may access the server device 100, and check, edit or delete his/her personal information by using the private key assigned to him/her.

In addition, the server device 100 may generate a homomorphic encryption public key (pk) and a secret key (sk) to be used for homomorphic encryption. In the disclosure, it is illustrated and described that the server device 100 directly generates a public key and a secret key, but the keys may be generated by a reliable third institution other than a server device.

When a plurality of monitoring devices 400-1 to 400-m are present as in FIG. 1, the server device 100 may generate a plurality of partial secret keys on the basis of the secret key. The server device 100 may transmit the plurality of partial secret keys to the plurality of monitoring devices 400-1 to 400-m, respectively.

When a user to which a private key is assigned consents on the usage of his/her information, a cryptogram $(Enc_{pk}(S_{i,j}))$ for which homomorphic encryption is performed to the private key may be uploaded to the blockchain system 10 by using the homomorphic encryption public key (pk).

For example, when a user of a second user device 300-2 provides his/her personal information to the server device 100, the server device 100 may transmit a private key used to encrypt the personal information to the second user device 300-2. The user of the second user device 300-s may give consent on utilization of his/her personal information. If the user agrees to the utilization of his/her data, the second user device 300-2 may upload a cryptogram in which the private key is encrypted to the blockchain system 10.

As another example, encryption of the private key and uploading of the cryptogram may be performed by the server device 100. In detail, when the user provides his/her personal information to the server device 100, if the user gives consent on personal information usage in a user interface (UI) provided by the server device 100, the server device 100 may perform homomorphic encryption to the private key and upload it to the blockchain system 10. In the disclosure, a key homomorphic cryptogram for which homomorphic encryption is performed will be referred to as a switch key.

In the disclosure, uploading or publishing information to the block chain system 10 means that the information is recorded in a public book (block) that is published at regular intervals (for example, 10 minutes) on a network to which a plurality of participants are connected. When the user revokes consent, the cryptogram of the private key recorded in the public book may be removed from the public book, or the fact that the corresponding cryptogram has expired or is invalid may be recorded in the public book. For convenience of explanation, a cryptogram of a private key will be herein called a switch key. The user may partially agree only to giving consent on the utilization of his/her personal information by another person.

The electronic device 200 refers to a device for utilizing personal information stored in the server device 100. The electronic device 200 may be implemented as a PC, a laptop PC, a mobile phone, a tablet PC, a server device and the like, owned by users or organizations who wish to utilize data, and may be otherwise called a data utilization institution.

The electronic device 200 may utilize the switch key uploaded to the blockchain system 100 and use a personal information cryptogram of the server device 100. The personal information cryptogram $(enc_{si,j}(D_{i,j}))$ may be switched to a personal information homomorphic cryptogram $(Enc_{pk}(D_{i,j}))$ by the switch key, then analyzed based on an analytic function set for the electronic device 200, and uploaded to the blockchain system 10. The operation of switching the personal information cryptogram into the personal information homomorphic cryptogram or the operation of performing the analysis using the analytic function may be carried out by the electronic device 200, by a virtual machine in the blockchain system 10, or by the server device 100. The respective embodiments are explained in greater detail below.

The monitor 400 may be implemented as one monitoring device, but may be also implemented as a plurality of monitoring devices 400-1 to 400-m for security improvement. The number of monitoring devices 400-1 to 400-m may be appropriately set in consideration of reliability and security. The plurality of monitoring devices 400-1 to 400-m may be implemented as a mobile phone, a tablet personal computer (PC), a PC, a laptop PC, a kiosk and the like owned or used by a monitor.

As described above, the plurality of monitoring devices 400-1 to 400-m may respectively obtain a partial secret key from the server device 100, and obtain a public key ($Pk_x$) for homomorphic encryption from the electronic device 200.

When a result of analysis is uploaded to the blockchain system 10, the respective monitoring devices 400-1 to 400-m may partially decrypt the result of analysis by the partial secret key. When the analytic function is expressed as Fl, the result of analysis may be expressed as $F_l(\text{Enc}_{pk}(D_{i,j})) = \text{Enc}_{pk}(F_l(D_{i,j}))$. In addition, a result of analysis partially decrypted in a k-th monitoring device 400-k among the monitoring devices 400-1 to 400-m may be expressed as $F_l(D_{i,j})k$.

The respective monitoring devices 400-1 to 400-m may encrypt the partially-decrypted result of analysis with the public key provided from the electronic device 200, and then upload the cryptogram to the blockchain system 10.

The electronic device 200 may obtain the cryptogram from the blockchain system, then decrypt the obtained cryptogram, and collect the partially-decrypted analysis result. When a partially-decrypted analysis result of more than a predetermined number is collected, the electronic device 200 may finally identify $F_l(D_{i,j})$ on the basis of the result.

Figure 2:
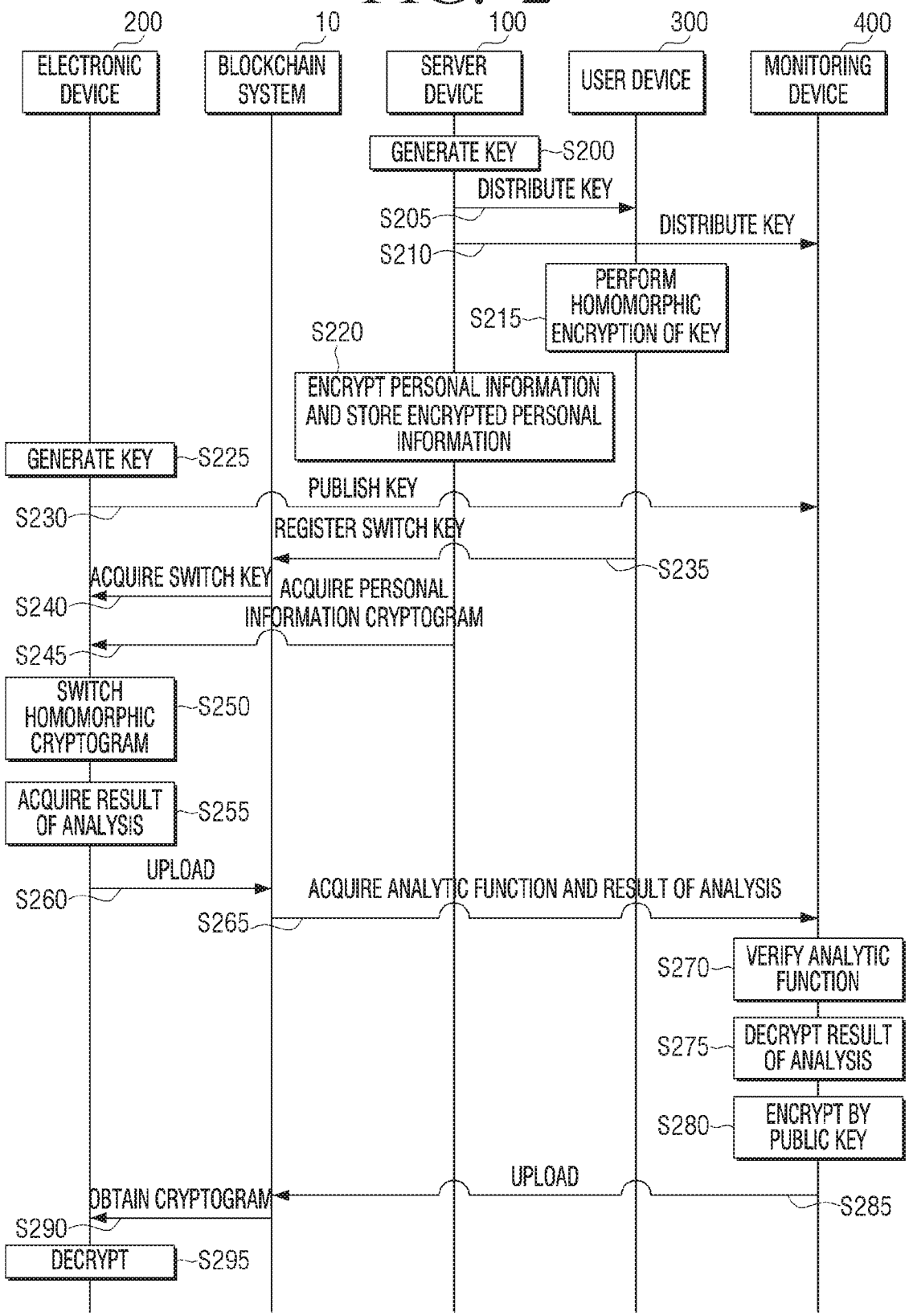
FIG. 2 is a timing diagram illustrating a data sharing method, according to an embodiment of the disclosure.

FIG. 2 is a timing diagram illustrating a data sharing method, according to an embodiment of the disclosure. In FIG. 2, one user device 300 and one monitoring device 400 are illustrated, but in an actual operation, multiple devices may be used.

In addition, the server device 100 may generate a private key to be assigned to a user, and a homomorphic encryption public key (pk) and a secret key (sk) to be used for homomorphic encryption, at operation S200. In addition, the server device may generate a plurality of partial secret key on the basis of the secret key. As described above, the key generation operation may be carried out by a third device rather than the server device.

The server device 100 may distribute the generated private key to the user device 300 at operation S205, and distribute the partial secret key to the monitoring device at operation S210. In a case that only one monitoring device is present, the server device 100 may skip a process of making a plurality of partial secret keys, and provide one secret key to the monitoring device.

The server device 100 may generate a personal information cryptogram for which encryption is performed to personal information of a user of the user device 300 by the private key, and store the generated personal information cryptogram, at operation S220. The personal information may be information which is obtained in a process of providing, by the server device 100, a service to the user or may be information which is additionally input by the user. For example, in a case that the server device 100 is implemented as a public office DB, the user may, when requesting various proof documents, write his/her name, address, resident registration number, types of desired proof documents, purpose of issue, and the like.

The user device 300 may generate a switch key by performing homomorphic encryption of the private key provided by the server device 100, at operation S215. The user device 300 may upload the generated switch key to the blockchain system 10, at operation S235. In FIG. 2, it is described that the user device 300 directly generates the switch key, and uploads it to the blockchain system 10. However, in another implementation, the same operation may be performed by the server device 100. For example, when the user transfers his/her intention to consent to personal information usage while inputting personal information in the server device 100, the server device 100 may perform homomorphic encryption of the private key and generate a switch key, and upload the generated switch key to the blockchain system 10.

The electronic device 200 to utilize data may generate a public key and a secret key for performing homomorphic encryption, at operation S225, and store the secret key in itself and publish the public key via a network at operation S230. The monitoring device 300 may obtain a public key published on the network, at operation S230.

In this case, when data to be utilized is present, the electronic device 200 may obtain a switch key corresponding to the data from the blockchain system 10, at operation S240. In addition, a personal information cryptogram may be obtained from the server device 100 at operation S245. The information relating to the server device 100 may be a uniform resource locator (URL), information provider (IP) address, etc. obtained online or offline by the electronic device 200, but is not limited thereto.

The electronic device 200 may perform homomorphic encryption of the personal information cryptogram by the switch key, at operation S250. When personal information homomorphic cryptogram is obtained, the electronic device 200 may apply the analytic function and obtain the result of analysis, at operation S255. As a simple example, when the analytic function is a function for obtaining a result of addition, the result of analysis may be a value obtained by adding multiple personal information homomorphic cryptograms.

The electronic device 200 may upload the obtained analysis result to the blockchain system 10, at operation S260.

The monitoring device 400 may obtain the analytic function and the result of analysis from the blockchain system 10, at operation S265. The monitoring device 400 may first verify the complexity of the analytic function at operation S270, and then, when the verification is successful, partially decrypt the result of analysis by the partial secret key at operation S275.

The monitoring device 400 may encrypt the partially-decrypted data by the public key provided from the electronic device 200, at operation S280, and upload the encrypted partially-decrypted data to the blockchain system 10 at operation S285. If a plurality of monitoring devices 400 are present, a plurality of cryptograms may be uploaded. The respective cryptograms uploaded from the plurality of monitoring devices may be called a partial cryptogram.

The electronic device 200 may obtain the cryptogram from the blockchain system 10, at operation S290. When a plurality of cryptograms respectively uploaded from the monitoring devices 400 of more than a predetermined number, that is, a plurality of partial cryptograms, are obtained, the electronic device 200 may decrypt the respective partial cryptograms with its own secret key, and then combine the partial decryptograms and obtain a result value of the analytic function, that is, the result of analysis, at operation S295.

As a result, the electronic device 200 may obtain analytic information acquired from the analysis of a plurality of personal information using an analytic function desired by the electronic device 200.

In FIG. 2, it is described that the electronic device 200 directly performs the switching of the homomorphic cryptogram and the analysis of the switched homomorphic cryptogram. However, in another embodiment, a virtual machine of a blockchain system may be involved. For example, the electronic device 200 may identify data and analytic function to be utilized, and upload the identified data and the identified analytic function to the blockchain system. The server device 100 may, when a request for utilization of a personal information cryptogram stored in itself is identified and a switch key corresponding to the data is registered in the blockchain system, switch the personal information cryptogram to the personal information homomorphic cryptogram by the switch key, and then input the personal information homomorphic cryptogram to the virtual machine. The virtual machine refers to software which is included in a blockchain platform.

The virtual machine may, as an input value of the analytic function identified by the electronic device 200, compute the result of analysis by the personal information homomorphic cryptogram, and then upload the computed analysis result to the blockchain system. That is, the computed analysis result is registered in the public book. In this embodiment, the computational burden on the electronic device may be lessened.

A public book, a condition of a virtual machine, a computational process, etc. in the blockchain system may be observed and verified by all participants. Accordingly, users providing their personal information may clearly learn how their personal information is utilized.

According to another embodiment, a reward may be given to at least one of the server device 100, user device 300 or monitoring device 400 in which the personal information is stored. The reward may be given in the form of cryptocurrencies, but is not limited thereto. A user of the electronic device 200 utilizing the data may, when requesting data usage, identify and input the amount of reward to be provided to the data provider, the monitoring device, etc. When the result of analysis is provided to the electronic device 200 according to the method described above, appropriate reward may be given to individuals who provided the personal information, a manager who manages the personal information, etc. The monitor, that is, all users of the monitoring device 400, may given a reward. However, the example is not limited thereto, and in an implementation, to induce a correct determination, reward may be only given when it is consistent with the determination of majority of the monitors.

In the embodiment described above, it is described that the homomorphic encryption cryptogram of the private key assigned to the user device 300, that is, the switch key, is registered in the public book, but is not limited thereto. For example, for personal information with low security, the private key for which the homomorphic encryption has not been performed may be itself registered in the public book. Alternatively, an intensity of user consensus may be divided into a plurality of levels, and for users who consent at a first level, a switch key may be registered in the public key, and for users who consent at a second level, a personal key may be registered in the public book. The operation of registering the private key or the switch key in the public book may be performed by the user device or directly by the server device.

Figure 3:
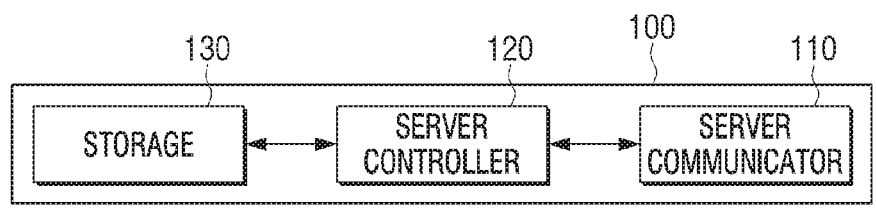
FIG. 3 is a block diagram illustrating a configuration of a server device, according to an embodiment of the disclosure.

FIG. 3 is a block diagram illustrating a configuration of a server device 100, according to an embodiment of the disclosure. Referring to FIG. 3, the server device 100 may include a server communicator 110, a server controller 120, and a storage 130.

The server communicator 110 includes various communication circuitry configured to communicate with various external devices via cable or wirelessly. The server communicator 110 may include a communication means of various forms according to a type and use environment of the server device 100. For example, it is possible to perform communication with external devices via at least one of wireless local area network (LAN), Wi-Fi, Bluetooth or Zigbee as well as various wired interface.

The server controller 120 may include various processing circuitry and generally controls the overall operation of the server device 100. The server controller 120 may be configured to include at least one processor and memory such as ROM, RAM and the like, or may be configured in the form of a system on chip (SoC) or an integrated chip (IC) logic.

The storage 130 may be configured to store various information, software, setting values and the like. The storage 130 may store various personal information or a cryptogram or key of that personal information. For example, if the server device 100 is a hospital DB for storing personal information used in the hospital, the personal information may be addresses, ages, names of disease, sex and the like of the patients. If the server device 100 is a public office DB, the personal information may be personal information, addresses, family relationship, marriage relationship and the like of people living in the corresponding area.

Although not illustrated in FIG. 3, the server device 100 may further include a display or various input means. The server controller 120 may receive input of various personal information through input means, and store the input various personal information in the storage 130. When information capable of specifying the user device 300 (for example, mobile phone number, etc.) is present among the information input through the input means, the server controller 120 may provide a private key to the user device 300 on the basis of the information. The server controller 120 may encrypt personal information by the private key, and store a personal information cryptogram, which is the result of analysis, in the storage 130. When a request for personal information cryptogram is received through the server communicator 110, the server controller 120 may transmit the personal information cryptogram to the device by which the request has been made.

In addition, the server controller 120 may generate a homomorphic encryption public key and homomorphic encryption private key which will be commonly used by all participants. The server controller 120 may generate the secret key as a plurality of partial secret keys, and provide the plurality of partial secret keys to the plurality of monitoring devices 400-1 to 400-$m$. In addition, the server controller 120 may provide the public key for homomorphic encryption to the user device 300 as well. The user device 300 may perform homomorphic encryption of the private key by the public key, and upload the private key for which the homomorphic encryption has been performed to the blockchain system 10.

According to an embodiment, the server controller 120 may generate a switch key by directly performing homomorphic encryption of the private key, and then upload the switch key to the blockchain system 10. Alternatively, the server controller 120 may directly generate a switch key, and then provide it to the user device 300.

In a case that a virtual machine is used as in the other embodiment described above, the server controller 120 may identify whether data requested by the blockchain system 10 is a personal information cryptogram stored in the storage 130. When it is determined that a request for stored personal information cryptogram is made, the server controller 120 may identify whether a switch key for the corresponding personal information cryptogram is registered in the blockchain system 10. When the switch key is registered, the server controller 120 may switch the personal information cryptogram to a personal information homomorphic cryptogram by the switch key, and provide the personal information homomorphic cryptogram to the virtual machine.

According to this configuration, the personal information itself is stored in the server device 100 and the private key or the switch key is registered in the blockchain system 10, and thus it is possible to store the personal information more safely while reducing the capacity of data uploaded to the blockchain system 10.

Figure 4:
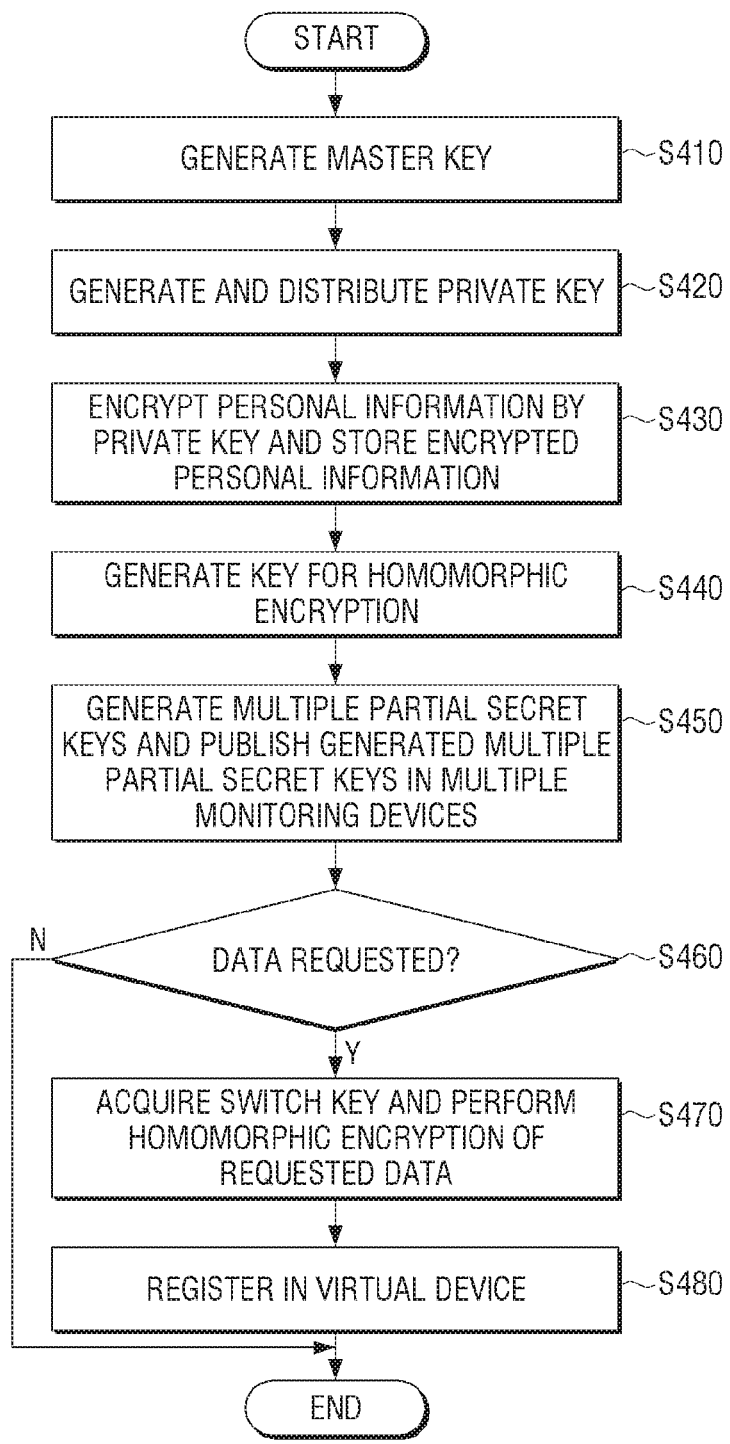
FIG. 4 is a flowchart illustrating a data sharing method of a server device, according to an embodiment of the disclosure.

FIG. 4 is a flowchart illustrating a data sharing method of a server device, according to an embodiment of the disclosure. In FIG. 4, it is assumed that a virtual machine is used.

Referring to FIG. 4, the server device 100 may generate an $MSK_i$, which is a master encryption key, at operation S410. The server device 100 may generate a private key to be provided to a user device providing personal information by the master encryption key. For example, the server device may set a $PRF(MSK_i, i)$, which is the result of analysis obtained from applying a Pseudo Random Function (PRF) to the $MSK_i$, as the personal key $S_{i,j}$. The server device 100 may encrypt the personal information by the generated private key, and store the encrypted personal information, at operation S430. In addition, the server device 100 may generate a public key and a secret key for homomorphic encryption, at operation S440. Homomorphic encryption technology may be used to generate the public key and the secret key. For example, the public key and the secret key may be expressed as in the mathematical formula shown below.

$$pk \leftarrow (A \| B) \in \mathbb{Z}_q^{m \times (n+l)}$$

$$sk \leftarrow S \in \{0, \pm 1\}^{n \times l} \quad \text{[Mathematical formula 1]}$$

In the mathematical formula 1, m is the number of rows of the public key, n is the number of columns of the public key, l is a length of a bit length of a plaintext message, and A and B are random matrices respectively including randomly-determined values. In addition, S is a secret matrix.

The respective random matrices of the mathematical formula 1 may be expressed as shown in the mathematical formula below.

$$A \leftarrow \mathbb{Z}_q^{m \times n}$$

$$B = -AS + E \in \mathbb{Z}_q^{m \times l} \quad \text{[Mathematical formula 2]}$$

In the mathematical formula 2, $\mathbb{Z}_q$ is a set of all integers included in the range of $-q/2$ to $q/2$. A is a m×n matrix including values randomly selected from $\mathbb{Z}_q$. B is a matrix which is computed using a first random matrix, a secret matrix (S) and an error matrix (E). For example, the secret matrix (S) may be implemented as a matrix for which at least one of −1, 0 or 1 is randomly combined in a matrix form, and the error matrix (E) may be implemented as a matrix which is computed by sampling a discrete Gaussian distribution independently with a standard deviation of $\sqrt{\alpha q}$ m times, computing a column vector, and concatenating the column vector l times.

However, this method for generating the public key and the secret key is only an example, and the homomorphic encryption key may not necessarily be generated in this way, and various homomorphic encryption key generation methods which are published may be used.

The server device 100 may provide the generated public key to the user device 300. In addition, the server device 100 may generate a plurality of partial secret keys on the basis of the generated secret key, and provide the generated plurality of partial secret keys to a plurality of monitoring devices, at operation S450.

For example, if an element s of $Z_q^n$ is a secret key, when the m number of partial secret keys are to be generated, partial secret keys such as s1, s2, . . . s{m−1} may be defined by selecting an arbitrary element of $Z_q^n$. The last partial secret key $s_m$ may be defined as s−(s1+ s2+ . . . +s{m−1}).

When partial secret keys are generated in this way and if it is assumed that decryption of the cryptogram c is <c,s> (inner product), the sum of all decryption values <c, s_i> by the partial secret keys s_i is a decryption value. However, this method is only an example, and may be modified to various forms according to embodiments.

When data stored in the server device 100 is requested at operation S460, the server device 100 may obtain a secret key published in the blockchain system 10, and perform homomorphic encryption of the requested data, that is, personal information cryptogram, at operation S470. In a case that the server device 100 includes the public key and directly generates the switch key, the server device 100 may not obtain the switch key from the blockchain system 10, and may perform the homomorphic encryption of the personal information cryptogram immediately.

The server device 100 may register the personal information homomorphic cryptogram in the virtual machine, at operation S480. The analysis of the personal information homomorphic cryptogram may be carried out by the virtual machine.

In the example described above, the configuration and operations of the server device managing personal information are described. Hereinafter, the configuration of operations of a utilizer utilizing personal information, that is, an electronic device, will be described in detail.

Figure 5:
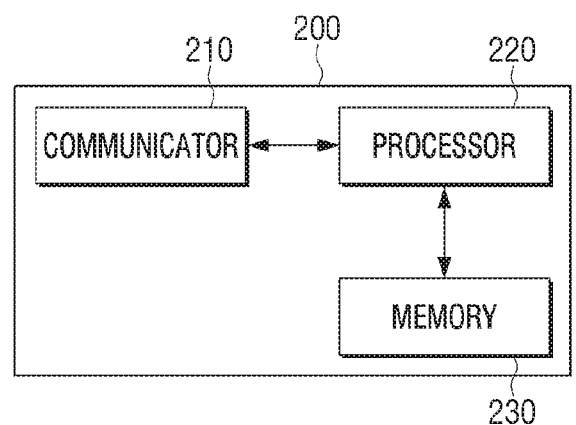
FIG. 5 is a block diagram illustrating a configuration of an electronic device, according to an embodiment of the disclosure.

FIG. 5 is a block diagram illustrating a configuration of an electronic device 200, according to an embodiment of the disclosure. Referring to FIG. 5, the electronic device 200 may include a communicator 210, a processor 220, and a memory 230. The electronic device 200 may further include various elements such as a display, input means and the like according to types of the electronic device 200. However, this will not be explained for the sake of brevity.

The communicator 210 may include various communication circuitry that performs communication with an external device according to various wired/wireless communication methods.

The processor 220 may access the blockchain system 10 or the server 100 via the communicator 210. In addition, the processor 220 may autonomously generate homomorphic encryption keys $Pk_l$ and $Sk_l$. The processor 220 may publish the homomorphic encryption public key $Pk_l$ in the plurality of plurality of monitoring devices via the communicator 210, and store the homomorphic encryption secret key $Sk_j$ in the memory 230.

The memory 230 may store various programs or data to be executed by the processor 220 as well as the homomorphic encryption secret key $Sk_j$. In the memory 230, an application or platform for using the blockchain system 10 may be stored.

The processor 220 may receive input of a request for analysis of specific data via an input means (not illustrated) built in or connected to the electronic device 200, or may receive a request for analysis from an external device via the communicator 210. The request for analysis may include personal information subject to utilization, an analytic function, etc.

Operations of the processor 220 may be implemented differently according to various embodiments.

Figure 6:
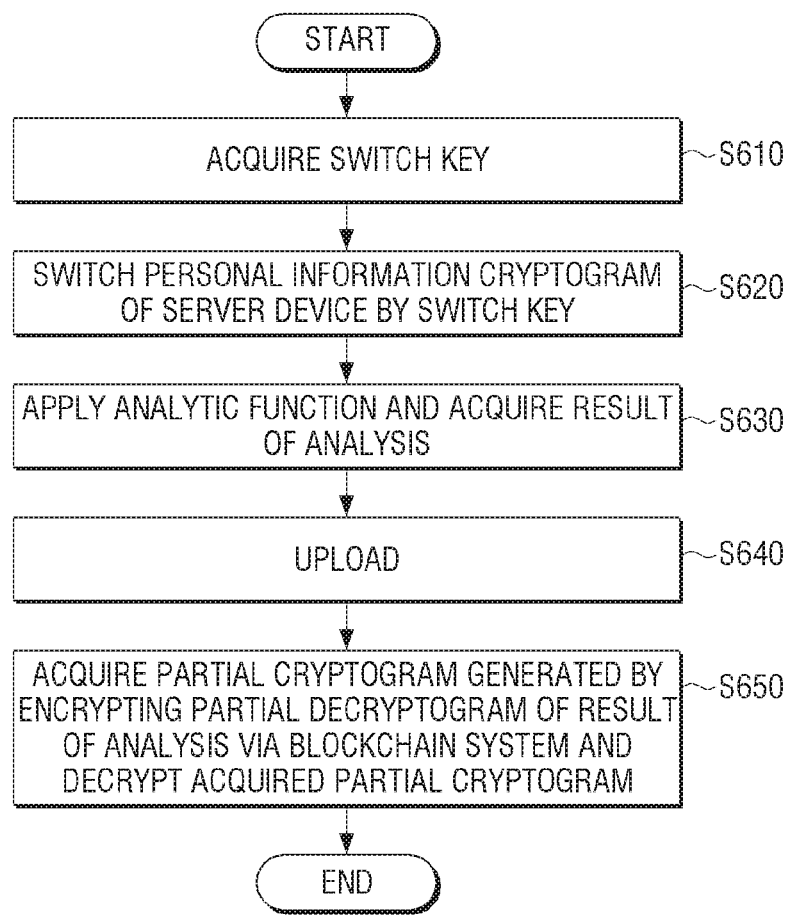
FIG. 6 is a flowchart illustrating a data sharing method of an electronic device, according to an embodiment of the disclosure.

According to an embodiment, the processor 220 may directly perform the analysis. FIG. 6 is a flowchart illustrating a data sharing method, according to the embodiment of the disclosure.

Referring to FIG. 6, when the data to be utilized and the analytic function are determined according to the request for analysis, the processor 220 may access the blockchain system 10 via the communicator 210 and obtain a switch key corresponding to the data, at operation S610. In addition, the processor 220 may obtain the personal information cryptogram stored in the server device via the communicator 210, and store the obtained personal information cryptogram in the memory 230. The processor 220 may switch the personal information cryptogram to a personal information homomorphic cryptogram by the switch key, at operation S620.

The processor 220 may apply the determined analytic function to the personal information homomorphic cryptogram, and obtain a result of analysis for which the homomorphic encryption is performed, at operation S630. The processor 220 may upload the result of analysis to the blockchain system 10 via the communicator 210, at operation S640. Thereafter, the monitoring device may perform partial decryption of the result of analysis, then perform encryption by the public key provided by the processor 220 and generate a partial cryptogram, and upload the generated partial cryptogram to the blockchain system 10. The processor 220 may obtain the cryptogram via the communicator 210, and then decrypt the obtained cryptogram, at operation S650. In this case, the processor 220 may determine whether a cryptogram of a partial decryptogram, that is, a partial cryptogram, of a number greater than or equal to a threshold is obtained, and if it is determined yes, decrypt the respective partial cryptograms and combine the decrypted partial cryptograms.

As a result, it is possible to identify the result of analysis of the personal information by the analytic function. The processor 220 may store the analysis result in the memory 230 or output it to the display (not illustrated). Alternatively, the processor 220 may transmit the analysis result to an external device via the communicator 210.

In a case that one monitoring device is present, a cryptogram for a full decryptogram may be uploaded to the blockchain system 10 rather than the partial decryptogram. In this case, the partial decryptogram may be immediately decrypted without threshold comparison.

Figure 7:
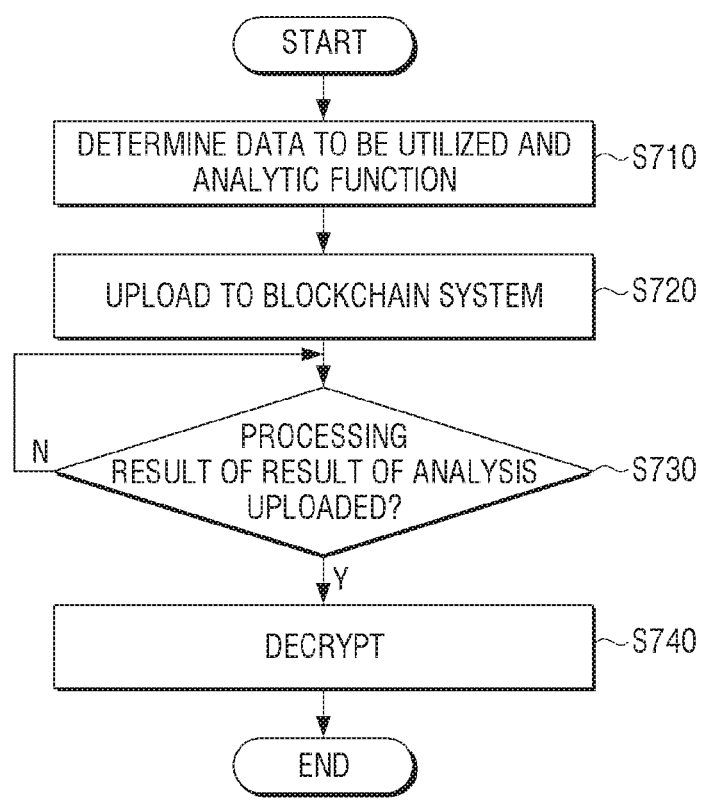
FIG. 7 is a flowchart illustrating a data sharing method of an electronic device, according to an embodiment of the disclosure.

According to another embodiment, the analysis may be performed by a virtual machine. FIG. 7 is a flowchart illustrating a method for sharing data by utilizing the virtual machine.

Referring to FIG. 7, when the data and analytic function to be utilized are determined according to the request for analysis at operation S710, the processor 220 may upload a request for analysis specifying the determined data and the analytic function to the blockchain system 10, at operation S720.

In a case that a plurality of server devices are present, the server device 100 storing the determined data may obtain a switch key corresponding to the data from the blockchain system. The server device 100 may switch the personal information cryptogram to a personal information homomorphic cryptogram by the switch key, and provide the personal information homomorphic cryptogram to the virtual machine. The virtual machine may analyze the personal information homomorphic cryptogram by the analytic function uploaded to the blockchain system 10, and upload the analyzed personal information homomorphic cryptogram to the blockchain system 10.

The processor 220 may frequently identify whether a result of processing for the analysis result is uploaded to the blockchain system 10, at operation S730. When the result of processing is identified, the processor 220 may obtain the identified processing result and decrypt it, at operation S740. The detail of each process is described above, and will not be further explained.

According to another embodiment of the disclosure, a reward is given for data sharing. The reward may be given from the electronic device 200 utilizing the data, but may be given from the server device 100 storing the data to a user device. In a case that a business model providing rewards is applied, the electronic device 100 may identify the reward content (cost, period of payment, etc.).

For example, when a user requests analysis of specific data, the processor 220 may provide a user interface (UI) on which the reward content can be determined. When the user agrees to the reward on the UI, an incentive for at least one of the server device, the user device or the monitoring device may be provided. The incentive may be paid in the form of cryptocurrencies commonly used in the blockchain system 10, but is not limited thereto. For example, the incentive may be paid in the form of various points, mileage, cash and the like possessed by the user. In addition, the payment method may be wired from a bank account in the user's name, or may be paid by an additional payment method (offline, gyro, etc.).

Figure 8:
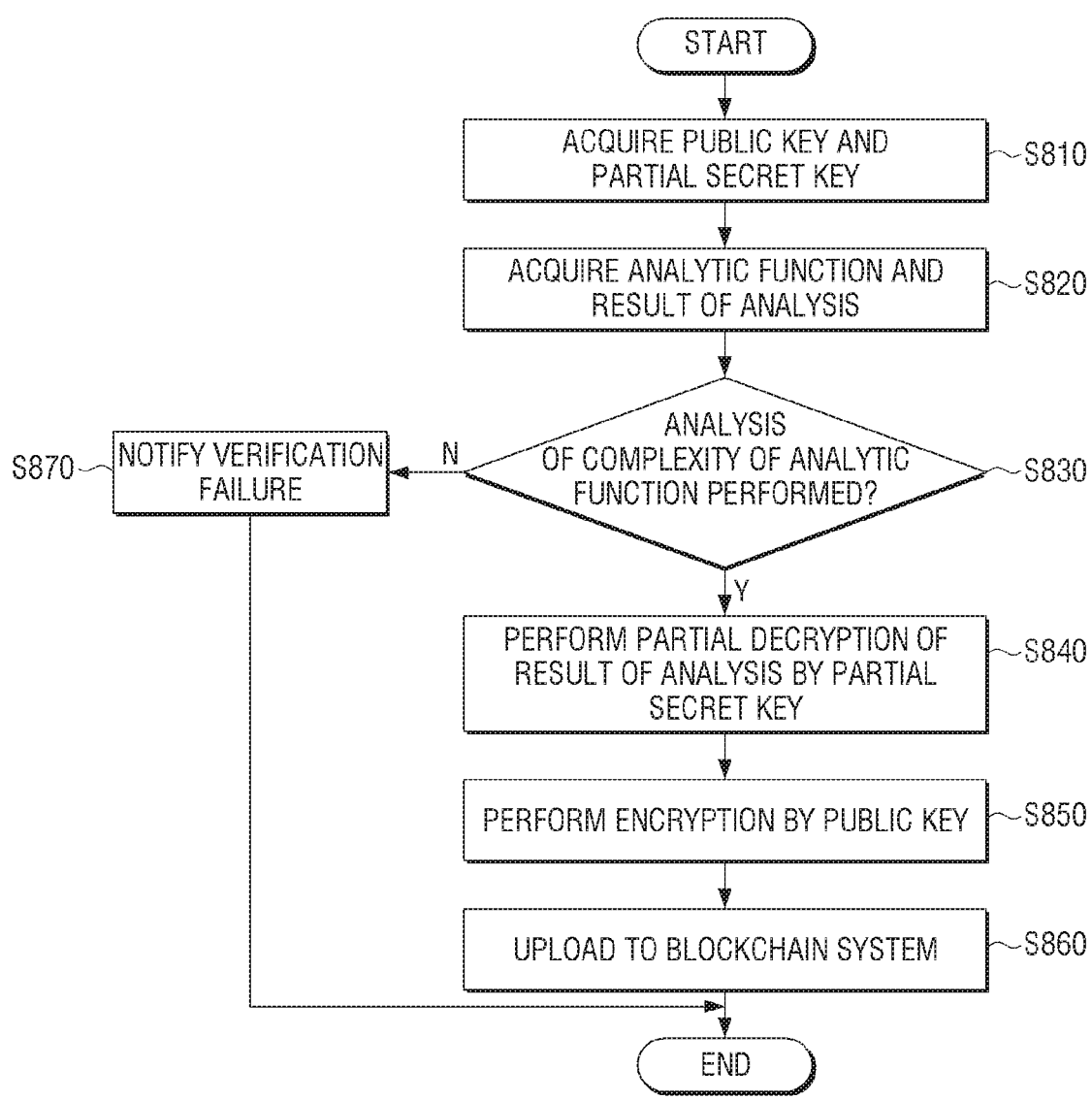
FIG. 8 is a flowchart illustrating a data sharing method of a monitoring device, according to an embodiment of the disclosure.

FIG. 8 is a flowchart illustrating a data sharing method performed in a monitoring device, according to an embodiment of the disclosure. The monitoring device of FIG. 8 refers to one of a plurality of monitoring devices. Referring to FIG. 8, the monitoring device 400 may obtain a partial secret key for performing decryption of personal information homomorphic encryption, a public key published in the electronic device 200, and the like, at operation S810.

In this state, when an analytic function and a result of analysis are uploaded to the blockchain system 10, the monitoring device 400 may obtain the uploaded analytic function and the uploaded analysis result, at operation S820.

When the analytic function is uploaded, the monitoring device may first verify the complexity of the analytic function, at operation S830. The verification of complexity may be made in various ways. For example, it may be determined that only an analytic function for which functions used in statistics is a lawful analytic function, and that the other analytic functions are unlawful.

If the verification of the monitoring device is successful, the result of analysis may be partially decrypted by the partial secret key at operation S840, and encrypted by the public key at operation S850. The monitoring device may upload the cryptogram to the blockchain system 10, at operation S860. When the verification fails, the monitoring device may inform by uploading the verification failure to the blockchain system 10 or by directly transmitting the result of analysis to the device to which the cryptogram is uploaded, at operation S870.

According to the various embodiments described above, data sharing may be performed by using homomorphic encryption technology and blockchain technology together. For example, when the user providing his/her personal information consents to usage of his/her information, a private key or a switch key capable of accessing the personal information may be uploaded to the blockchain system. The private key or the switch key may be utilized in various ways.

Figure 9:
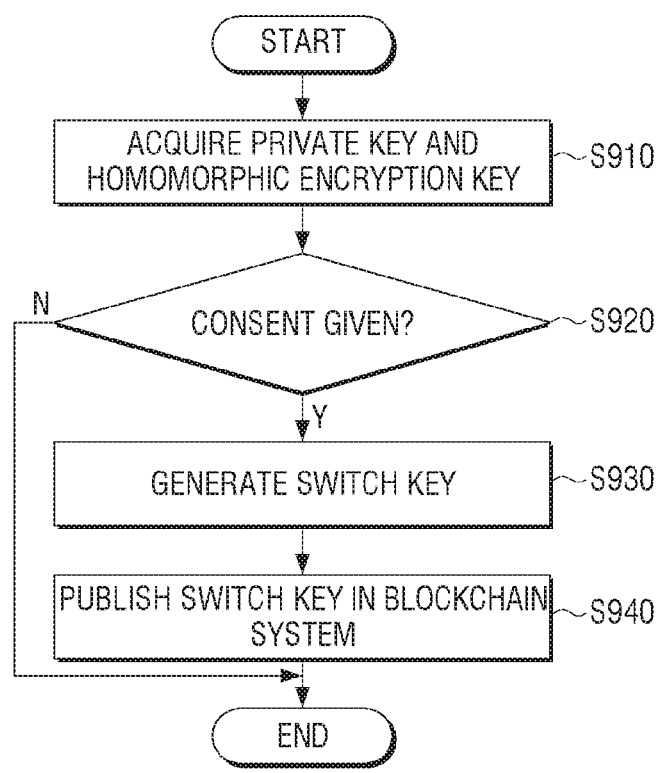
FIG. 9 is a flowchart illustrating a data sharing method of a user device, according to an embodiment of the disclosure.

FIG. 9 is a flowchart illustrating a data sharing method of a user device, according to an embodiment of the disclosure. Referring to FIG. 9, the user device may obtain a private key and a homomorphic encryption key from a server device, at operation S910.

When a user's consent is input at operation S920, the user device may encrypt the private key by the homomorphic encryption key, and generate a switch key, at operation S930. The user device may publish the generated switch key in the blockchain system, at operation S940.

The user's consent may be input by the user through a UI screen displayed on the display included in the user device, but is not limited thereto. As described above, for insignificant data or data on which the user additionally gives consent, the user device may publish the private key itself in the blockchain system instead of the switch key. The user device for performing this operation may be implemented to include a memory, a processor, a communicator, etc., but those features are similar to the features of the electronic device of FIG. 5, and will not be illustrated and explained.

The various data sharing methods as described above may be implemented as a business model in which various devices are interlocked with each other.

Figure 10:
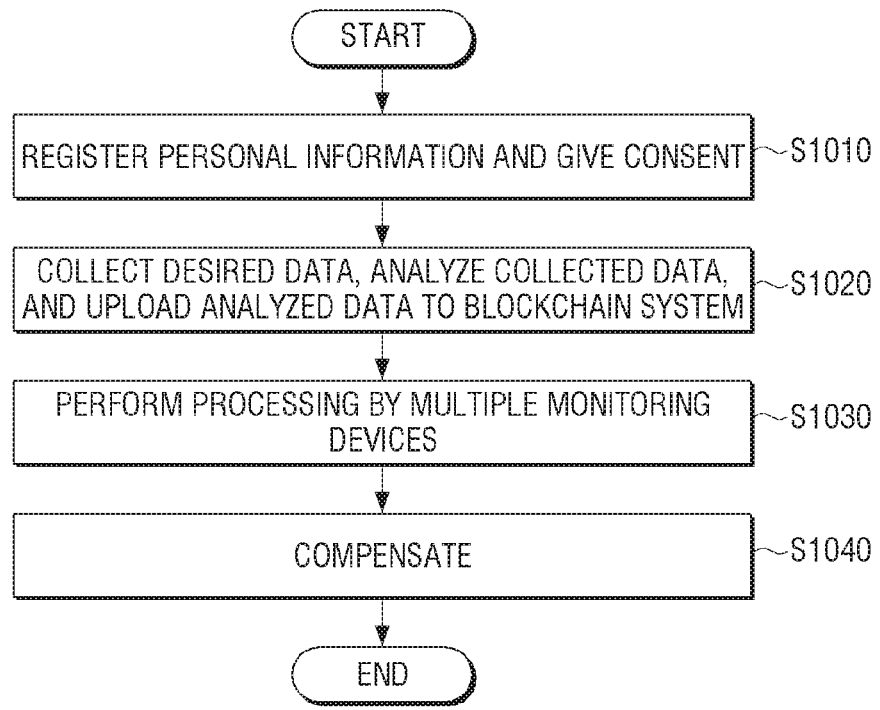
FIG. 10 is a flowchart illustrating a method for sharing data through a blockchain system.

FIG. 10 is a flowchart provided to explain an example business model for data sharing. Referring to FIG. 10, the user may provide his/her personal information to a specific manager. In this case, the user may be provided with an opportunity to determine whether to consent to usage of personal information, at operation S1010. The user's consensus may be input through a homepage provided by a manager storing the personal information, or may be input as a reply to text messages or e-mails sent to the user device possessed by the user. Alternatively, the user's consensus may be input in such a manner that a document written by the user offline is submitted and the submitted document is uploaded by the manager. When the user's consent is input, a switch key for which homomorphic encryption of the private key capable of identifying the user's personal information is performed may be uploaded to the blockchain system.

Independently of the above, the private key may be provided to the user device. The user may access the corresponding institution, that is, the server device, by the private key provided to the user device, and delete his/her information, edit it, or add information.

In addition, depending on the type of personal information or the intensity of user's consent, it may be determined so that the private key itself is uploaded to the blockchain system rather than the switch key.

The utilizer to utilize the information retained by the manager may make a request for analysis which includes desired data, a method for analyzing the data, etc. The request for analysis may be published through the blockchain system 10. When the request for analysis is published, the personal information cryptogram possessed by the manager may be switched to the personal information homomorphic cryptogram by the switch key published in the blockchain 10, and analyzed by the analytic function. The switching and analysis of cryptogram may be performed by another entity according to an embodiment, and is described above. The result of analysis may be uploaded to the blockchain system, at operation S1020.

When the result of analysis is uploaded to the blockchain system 10, processing is performed by a plurality of monitors, at operation S1030. The respective monitors may perform partial decryption by their partial secret keys, and then perform switching to a cryptogram by the public key published by the utilizer. The cryptogram may be provided to the utilizer through the blockchain system 10, and the utilizer may perform decryption by his/her secret key, and identify the final result value of analysis.

When this process is carried out, reward may be given to participants contributing to data sharing from among the participants participating in each process. To this end, it may be configured to, when the utilizer requests data usage, input rewards which will be provided to the data provider or the monitors. The period of reward payment may be variously determined according to business models. For example, as soon as the result of analysis is uploaded to the blockchain system 10, reward may be given to the individual who provides that personal information or the manager. As for the monitors, as soon as cryptograms are uploaded for a partial decryptogram of more than a predetermined number, reward may be given.

The various embodiments as described above may be applicable to various environments. For example, if the manager is a hospital, the manager may store various personal information (address, age, name of a disease, progress, and cause) obtained in the process of treating patients.

In this case, the utilizer may be an insurance company. The insurance company may request analysis of a type and cause of diseases frequently outbreaking in a specific region, age group and gender, and secure the result of analysis, and then design various insurance products according to the analysis result. Alternatively, if a food company is the utilizer, the food company may, on the basis of the analysis result, determine to hold a promotional event for products effective in the cure for the frequently-outbreaking diseases.

In addition, the personal information may be utilized in various forms. According to this method, individuals can freely decide whether to consent to usage of their data, and the monitoring of places of data usage is possible. In addition, data management institutions can manage data safely and data utilizers can utilize the data efficiently.

Hereinabove, various embodiments are described with reference to flowcharts and block diagrams. The order of steps illustrated in the respective flowcharts is only an example, and may be modified according to circumstances. According to an embodiment, some of the steps may be omitted or a new step may be added.

A program code for performing a data sharing method, a key generation method, an encryption method, a decryption method, and a verification method according to various embodiments as described above may be distributed as being stored in a recording medium. In this case, a device on which a recording medium is mounted may perform the operations according to the various embodiments described above.

The recording medium may be a computer-readable medium of various types, such as ROM, RAM, a memory chip, a memory card, an external hard drive, a hard drive, a compact disc (CD), a digital versatile disc (DVD), a magnetic disc, or a magnetic tape.

Although the description of the disclosure is made with reference to the accompanying drawings, the scope of the rights is defined by the appended claims and is not construed as being limited to the described embodiments and/or the drawings. In addition, it should be understood that the disclosure includes various improvements, modifications and changes of the embodiments of the claims which are obvious to those skilled in the art are included in the scope of rights of the disclosure.

What is claimed is:

1. A data sharing method of an electronic device, the data sharing method comprising:
    acquiring a switch key from a blockchain system;
    switching a personal information cryptogram stored in a server device to a personal information homomorphic cryptogram by the switch key;
    applying an analytic function to the personal information homomorphic cryptogram, and acquiring a result of analysis for which a homomorphic encryption is performed;
    uploading the result of analysis to the blockchain system; and
    based on a processing result of the result of analysis in a plurality of monitoring devices respectively including a partial secret key being published in the blockchain system, decrypting the processing result,
    wherein the processing result is a plurality of partial cryptograms which are generated by encrypting a partial decryptogram for which a decryption of the result of analysis is performed using the partial secret key by each of the plurality of monitoring devices to a public key published by the electronic device, and
    wherein the decrypting comprises:
        identifying a number of the plurality of partial cryptograms acquired from the blockchain system; and
        based on the number exceeding a preset threshold, decrypting the plurality of partial cryptograms and combining the decrypted plurality of partial cryptograms.

2. The data sharing method as claimed in claim 1, wherein the personal information cryptogram is a cryptogram which is generated by encrypting personal information of a user by a private key generated in the server device, and
    wherein the switch key is a key homomorphic cryptogram for which a homomorphic encryption of the private key is performed.

3. The data sharing method as claimed in claim 2, further comprising:
    uploading the analytic function to the blockchain system; and
    providing a cryptocurrency commonly used in the blockchain system as an incentive for at least one of the server device or the plurality of monitoring devices.

4. An electronic device, comprising:
    a communicator configured to communicate with a blockchain system and a server device;
    a memory configured to store a switch key acquired from the blockchain system via the communicator; and
    a processor configured to acquire a personal information cryptogram stored in the server device via the communicator, and switch the acquired personal information cryptogram to a homomorphic cryptogram by the switch key,
    wherein the processor is configured to:
        apply an analytic function to the homomorphic cryptogram, and acquire a result of analysis for which a homomorphic encryption is performed;
        upload the result of analysis to the blockchain system via the communicator; and
        based on a processing result of the result of analysis in a plurality of monitoring devices respectively including a partial secret key being published in the blockchain system, and based on a number of the processing result acquired from the blockchain system exceeding a preset threshold, decrypt the processing result and combine the decrypted processing result, and
    wherein the processing result is a plurality of partial cryptograms which are generated by encrypting a partial decryptogram for which a decryption of the result of analysis is performed using the partial secret key by each of the plurality of monitoring devices to a public key published by the electronic device.

5. The electronic device as claimed in claim 4, wherein the personal information cryptogram is a cryptogram which is generated by encrypting personal information of a user by a private key generated in the server device, and
    wherein the switch key is a key homomorphic cryptogram for which a homomorphic encryption of the private key is performed.

6. The electronic device as claimed in claim 5, wherein the processor is configured to:
    upload the analytic function to the blockchain system; and
    provide a cryptocurrency commonly used in the blockchain system as an incentive for at least one of the server device or the plurality of monitoring devices.

* * * * *